United States Patent

[11] 3,601,702

[72] Inventor Adam Lender
Palo Alto, Calif.
[21] Appl. No. 807,578
[22] Filed Mar. 17, 1969
[45] Patented Aug. 24, 1971
[73] Assignee GTE Automatic Electric Laboratories Incorporated
Northlake, Ill.

[54] HIGH SPEED DATA TRANSMISSION SYSTEM UTILIZING NONBINARY CORRELATIVE TECHNIQUES
7 Claims, 10 Drawing Figs.

[52] U.S. Cl. .......... 325/38 A, 325/38 R, 325/41, 178/68
[51] Int. Cl. .......... H03k 13/256, H03k 13/34
[50] Field of Search .......... 325/38, 41, 42, 38 A, 141, 321; 328/59; 332/9; 340/347, 348, 345, 146.1; 178/68; 179/15.55

[56] References Cited
UNITED STATES PATENTS
3,492,578 1/1970 Gerrish .......... 325/42

*Primary Examiner*—Robert L. Griffin
*Assistant Examiner*—Kenneth W. Weinstein
*Attorneys*—Cyril A. Krenzer, K. Mullerheim, B. E. Franz and Leonard R. Cool

ABSTRACT: A digital data transmission system which significantly increases the transmission rate of a binary data signal over a band limited transmission channel employs correlative techniques utilizing novel precoding for converting a binary input signal into a multilevel nonbinary correlative signal which is transmitted. Each level of the transmitted signal, seven being required to achieve a factor of eight improvement in transmission rate, represents a particular combination of the original binary digits, and introduction of correlative properties at the transmitter permits the original binary data to be recovered at the receiver with standard logic circuits without reference to the past history of the waveform. The correlative properties of the transmitted signal also permit error detection without adding redundant digits at the transmitter end. The bit speed capability of the concept is not limited to eight times that of a binary system but, in general, is equal to $2\log_2 Q$ per Hertz in carrier applications, where Q is equal to the number of levels of a noncorrelative nonbinary signal and is an integer greater than two.

INVENTOR.
ADAM LENDER

BY

ATTY.

TABLE IV

TRANSMITTED DATA

| DIGIT POSITION | X | Y | Z | W | $C_1$ | $C_2$ | SIGNAL LEVEL CORRESPONDING TO $C_1$, $C_2$ AT INPUT TO CONVERSION FILTER | SIGNAL LEVEL AT OUTPUT OF CONVERSION FILTER |
|---|---|---|---|---|---|---|---|---|
| | | | | | 1 | 0 | 3 | |
| | | | | | 1 | 0 | 3 | |
| 1 | 0 | 1 | 1 | 0 | 0 | 0 | 0 | -3 |
| 2 | 0 | 1 | 1 | 0 | 0 | 0 | 0 | -3 |
| 3 | 1 | 1 | 0 | 0 | 1 | 1 | 2 | 2 |
| 4 | 0 | 0 | 0 | 0 | 0 | 0 | 0 | 0 |
| 5 | 0 | 0 | 1 | 1 | 1 | 1 | 2 | 0 |
| 6 | 1 | 1 | 0 | 0 | 1 | 1 | 2 | 2 |
| 7 | 0 | 1 | 1 | 1 | 1 | 0 | 3 | 1 |
| 8 | 0 | 1 | 1 | 1 | 1 | 0 | 3 | 1 |
| 9 | 0 | 1 | 1 | 0 | 0 | 0 | 0 | -3 |
| 10 | 0 | 1 | 1 | 0 | 0 | 0 | 0 | -3 |
| 11 | 0 | 0 | 0 | 0 | 0 | 0 | 0 | 0 |
| 12 | 1 | 0 | 0 | 0 | 1 | 0 | 3 | 3 |
| 13 | 1 | 0 | 0 | 0 | 1 | 0 | 3 | 3 |
| 14 | 0 | 1 | 1 | 0 | 0 | 0 | 0 | -3 |
| 15 | 0 | 1 | 1 | 0 | 0 | 0 | 0 | -3 |
| 16 | 0 | 0 | 0 | 0 | 0 | 0 | 0 | 0 |
| 17 | 0 | 0 | 0 | 0 | 0 | 0 | 0 | 0 |
| 18 | 1 | 0 | 0 | 0 | 1 | 0 | 3 | 3 |
| 19 | 0 | 1 | 0 | 0 | 0 | 1 | 1 | 1 |
| 20 | 0 | 0 | 1 | 0 | 1 | 0 | 3 | 0 |
| 21 | 0 | 1 | 0 | 1 | 1 | 1 | 2 | 1 |
| 22 | 0 | 1 | 1 | 0 | 0 | 0 | 0 | -3 |
| 23 | 1 | 0 | 1 | 1 | 0 | 1 | 1 | -1 |
| 24 | 1 | 0 | 0 | 0 | 1 | 0 | 3 | 3 |
| 25 | 1 | 1 | 0 | 1 | 1 | 0 | 3 | 2 |
| 26 | 1 | 1 | 1 | 0 | 0 | 1 | 1 | -2 |
| 27 | 0 | 1 | 1 | 0 | 0 | 0 | 0 | -3 |

FIG. 9

TABLE V
RECEIVED DATA WITH ERRORS

| DIGIT POSITION | X′ | Y′ | Z′ | W′ | $C_1'$ | $C_2'$ | MEMORY RESET | SIGNAL LEVEL CORRESPONDING TO $C_1, C_2$ AT INPUT TO CONVERSION FILTER | SIGNAL LEVEL AT OUTPUT OF CONVERSION FILTER |
|---|---|---|---|---|---|---|---|---|---|
| | | | | | 1 | 0 | | 3 | |
| | | | | | 1 | 0 | | 3 | |
| 1 | 0 | 1 | 1 | 0 | 0 | 0 | | 0 | −3 |
| 2 | 0 | 1 | 1 | 0 | 0 | 0 | | 0 | −3 |
| 3 | 1 | 1 | 0 | 0 | 1 | 1 | | 2 | 2 |
| 4 | 1 | 1 | 0 | 0 | 1 | 1 | | 2 | 2 |
| 5 | 1 | 1 | 1 | 1 | 0 | 0 | | 0 | −2 |
| 6 | 1 | 1 | 1 | 1 | 0 | 0 | | 0 | −2 |
| 7 | 0 | 1 | 0 | 0 | 0 | 1 | | 1 | 1 |
| 8 | 0 | 1 | 0 | 0 | 0 | 1 | | 1 | 1 |
| 9 | 0 | 1 | 0 | 1 | 1 | 1 | 0 0 | 2 / 0 | 1 / -3 |
| 10 | 0 | 1 | 0 | 1 | 1 | 1 | 0 0 | 2 / 0 | 1 / -3 |
| 11 | 0 | 0 | 0 | 0 | 0 | 0 | | 0 | 0 |
| 12 | 1 | 0 | 0 | 0 | 1 | 0 | | 3 | 3 |
| 13 | 1 | 0 | 0 | 0 | 1 | 0 | | 3 | 3 |
| 14 | 0 | 1 | 1 | 0 | 0 | 0 | | 0 | -3 |
| 15 | 0 | 1 | 1 | 0 | 0 | 0 | | 0 | -3 |
| 16 | 0 | 1 | 0 | 0 | 0 | 1 | | 1 | 1 |
| 17 | 0 | 0 | 0 | 0 | 0 | 0 | | 0 | 0 |
| 18 | 1 | 0 | 0 | 1 | 0 | 0 | 1 0 | 0 / 3 | 0 / 3 |
| 19 | 0 | 1 | 0 | 0 | 0 | 1 | | 1 | 1 |
| 20 | 0 | 0 | 1 | 0 | 1 | 0 | | 3 | 0 |
| 21 | 0 | 1 | 0 | 1 | 1 | 1 | | 2 | 1 |
| 22 | 0 | 1 | 1 | 0 | 0 | 0 | | 0 | -3 |
| 23 | 1 | 0 | 1 | 1 | 0 | 1 | | 1 | -1 |
| 24 | 1 | 0 | 0 | 0 | 1 | 0 | | 3 | 3 |
| 25 | 1 | 1 | 0 | 1 | 1 | 0 | | 3 | 2 |
| 26 | 1 | 1 | 1 | 0 | 0 | 1 | | 1 | -2 |
| 27 | 0 | 1 | 1 | 0 | 0 | 0 | | 0 | -3 |

FIG. 10

HIGH SPEED DATA TRANSMISSION SYSTEM UTILIZING NONBINARY CORRELATIVE TECHNIQUES

BACKGROUND OF THE INVENTION

This invention relates to data transmission systems, and more particularly to a correlative technique which permits transmission of data at speeds significantly above presently achievable rates in a band limited channel.

The continuing demand for the rapid transmission of data has created a requirement for new data transmission techniques. However, in systems of which applicant is aware, the increase in transmission rate is achieved only at the expense of unacceptable equipment complexity, and hence greater cost, or in poorer performance, relative to a binary system. One example of known bandwidth compression techniques which permits transmission of more than one bit of information in a Nyquist interval is the quaternary baseband system, which compresses the bandwidth by a factor of two relative to binary. Here, serial binary data, represented by 0 and 1, is converted at the transmitter into four levels, each of which represents two of the original binary digits. In Gray code, the successive levels would represent 00, 01, 11 and 10, for example. The use of codes where successive levels differ only by one bit, such as the Gray code, is preferred because the difference of interpretation between adjacent levels causes only one of the digits to be in error. For example, if the level is actually 1, in which the two digits of the quaternary system are 01, an interpretation of the level at the receiver as 0 due to distortion caused by transmission impairments would result in an output sequence of 00, thus causing only a single error.

Similar compression techniques may be used in carrier transmission using AM, FM, phase modulation, etc. Where carrier is used and compression is required, phase modulation can be used, for example, with *n* phases. The number of phases could be 4, 8, 16 or 32 for a practical system in which the total number of phase positions is a power of two. Four-level or four-phase systems, which permit the transmission of one bit of information per cycle of available bandwidth in double sideband carrier transmission, have been used commercially. This system, then, has a data transmission rate twice that of a binary system transmitting over the same band limited channel.

The old and well-known vestigial sideband transmission technique has gained popularity in recent years as a means of compressing the bandwidth for high-speed data transmission. However, the success of this system depends on synchronous detection which requires that the carrier be regenerated with the correct frequency and phase at the receiver. The frequency can be quite accurately regenerated by the use of pilots. However, the phase must be recovered from the modulated signal and the characteristic of the vestigial signal makes accurate recovery of signal phase quite difficult. The accuracy with which the carrier is regenerated directly affects the permissible rate of transmission and error rates.

In comparing bandwidth compression transmission techniques with a binary system, not only is the complexity, and hence cost, of the equipment considered but the error performance relative to that of the binary system must also be evaluated. Error performance is most often established in terms of the noise penalty suffered by the higher speed system. Many factors affect the noise penalty, but the approximate value is assumed to be dependent upon the ability of the system to interpret a particular amplitude level or its equivalent. As shown in applicant's article entitled "Correlative Level Coding for Binary-Data Transmission," *IEEE Spectrum*, Feb. 1966, page 107, the approximate noise penalty relative to a binary system in db., is $20\log_{10}(b-1)$, where $b$ is the number of levels. For the quaternary AM system, the noise penalty is approximately 9.5 db., and while the noise penalty for a four-phase system is somewhat less than that of the AM quaternary, it suffers from the cost and complexity of equipment required for proper recovery of the transmitted information.

The foregoing brief review shows the desirability of increasing the transmission rate without squaring the number of levels or phases for each doubling of the bit rate, as is the case for the multilevel techniques discussed above. It is also desirable to have a technique whereby each level or phase separately identifies the original binary data bits without regard to the past history of the waveform. These desirable criteria are found in the correlative techniques described in the aforementioned *IEEE Spectrum* article, and the duobinary correlative techniques mentioned therein are described in greater detail in applicant's U.S. Pat. Nos. 3,234,465 and 3,238,299. Another correlative technique, which will be referred to hereinafter as the "orthogonal correlative technique" is disclosed in applicant's copending application Ser. No. 590,871 filed Oct. 31, 1966 (now U.S. Pat. No. 3,515,991) and assigned to the assignee of the present application. These correlative techniques require less levels than the other prior art multilevel systems and have the further desirable feature that each level separately represents one original binary digit. An additional feature of applicant's earlier correlative techniques is that the line signal follows predetermined rules which permit error detection without the need for adding redundant digits.

Data systems using the duobinary or orthogonal correlative techniques readily permit doubling or quadrupling, respectively, the data rate with a minimum of equipment complexity and cost. The present invention is an improvement over these prior art correlative techniques in that it readily increases the data rate to eight times, or more, that of a binary system. Thus, if a binary system could transmit data at 1,200 bits per second (b/s), a duobinary system could transmit 2,400 b/s, an orthogonal correlative system could transmit 4,800 b/s, and the system in accordance with the present invention could transmit 9,600 b/s, or more, in the same bandwidth.

It is therefore an object of this invention to increase the rate at which data can be transmitted over a limited bandwidth channel without unduly increasing system complexity or cost.

Another object of the invention is to obtain an increased data rate using a minimum number of amplitude levels.

It is a further object of this invention to provide a transmission waveform having such correlative properties that errors in transmission may be detected without adding redundant bits which would decrease the data rate.

SUMMARY OF THE INVENTION

Briefly, the foregoing objects are achieved by introducing correlation into the digital signal at the transmitting end of the system. Since most equipment employing digital signals either transmits or receives a binary signal, the invention will be described in the environment of binary input and output signals, but as will be seen the technique is applicable to nonbinary input signals as well.

The introduction of correlation in the input binary signal is accomplished by a four-step process. First, the binary data, usually in serial form, is converted into $\log_2 Q$ parallel binary data streams. The term Q is the same quantity as mentioned earlier, but, from a design standpoint, its value is determined from the bandwidth compression required in a given application. In practical situations, the bandwidth of the transmission channel has some fixed value, and the value of Q is determined by the rate it is desired to transmit binary data over the band limited channel. More specifically, the value of Q is determined as follows. In the present system the speed in b/s per Hz. of bandwidth is $2\log_2 Q$, where Q was defined before. If the desired speed and the bandwidth of the bandlimited channel are known, the ratio of the speed in b/s to this bandwidth in Hz. equals $2\log_2 Q$ and this determines Q. Next the input serial binary data at the desired speed is separated into $\log_2 Q$ parallel data streams, which may be accomplished by a shift register of known design with $\log_2 Q$ stages. By way of example, when the desired serial binary data rate is, say, 9,600 b/s and the bandwidth 2,400 Hz., the ratio is four. Hence $2\log_2 Q$ equals four and $Q=4$. Further, the serial binary data stream is separated into $\log_2 Q$, or two, parallel binary data streams; this may be accomplished by a two-stage shift register.

Second, the parallel binary data streams are coded, using known logic gates, to introduce memory in the following manner. The output is delayed two digit intervals and combined in a logic circuit with the binary input signal. The delayed output of each separate binary data stream is applied to the logic circuit of each of the other data streams as well.

The coded binary signals, $\log_2 Q$ in number, are next combined in a Q-level converter, which may be a conventional digital-to-analog converter, which converts the binary data streams into a coded multilevel signal having Q levels.

Final processing and correlation is achieved by passing the coded multilevel signal through a band-pass filter having a pass band characteristic ideally sinusoidal and expressed by the formula $|1-e^{-j2\omega T}|$ over the interval 0 to 1/2T Hz., where T is the digit duration of the Q-level signal in seconds. The effect of such a filter on the Q-level input signal is to subtract the digit two intervals back from the present digit, with the result that the number of amplitude levels at the output of the filter is greater than the number of amplitude levels at the input to the filter. For example, if Q is assumed to be 4, the input levels to the filter may be designated 0, 1, 2 and 3. Because of subtraction, any of these four levels except 0 can be negative and any level differences may occur. The possible extreme levels therefore are +3 and −3, and the levels that may be obtained are: +3, +2, +1, 0, −1, −2 and −3. It is evident that the number of levels at the output of the filter is equal to twice the number of signal amplitude levels at the input to the filter, less one. In the present example, with Q equal to 4, the number of amplitude levels at the output of the filter is $(2Q-1)=7$. Because of the coding and correlation introduced into the data signal, each level at the output of the filter corresponds uniquely to one particular group of $\log_2 Q$ binary digits of the serial binary input signal. The filter also provides signal shaping so that the output waveforms are not rectangular but smooth, analog.

The binary data is readily recovered at the receiving terminal by using straightforward logic. The amplitude of the nonbinary correlative waveform during successive digit durations T is determined with suitable slicer circuits, for example, and the amplitude information applied to logic, sampling and reconversion circuits to obtain the serial binary output.

Besides contributing to increased data rates, the correlation properties of the transmitted wave can be used to detect errors and thus obviate the need of introducing redundant digits into the input binary data. Logic and sampling circuits provide a replica of the binary input data in parallel form except for errors that might have occurred in the transmission waveform. This binary data is coded in exactly the same way as in the transmitter. The principle is to ascertain whether the extreme levels—top and bottom—correspond to the present and past digits emanating from the encoder and digital memory. A comparison is made at the sampling instant of the digit. If there is a disagreement, an error is indicated and memory is reset to the correct state. Such a comparison is done when the extreme levels are present because only the extreme levels are formed in a unique way in correlative systems. Intermediate levels may be formed in more than one way and are therefore not suitable for detection of errors.

BRIEF DESCRIPTION OF THE DRAWINGS

The construction and operation of the data transmission system according to the invention will be better understood from the following detailed description, taken in conjunction with the accompanying drawings, in which:

FIGS. 9 and 10 are tables of binary representations related to the waveforms of FIG. 8.

DESCRIPTION OF THE PREFERRED EMBODIMENT

Figure 1:
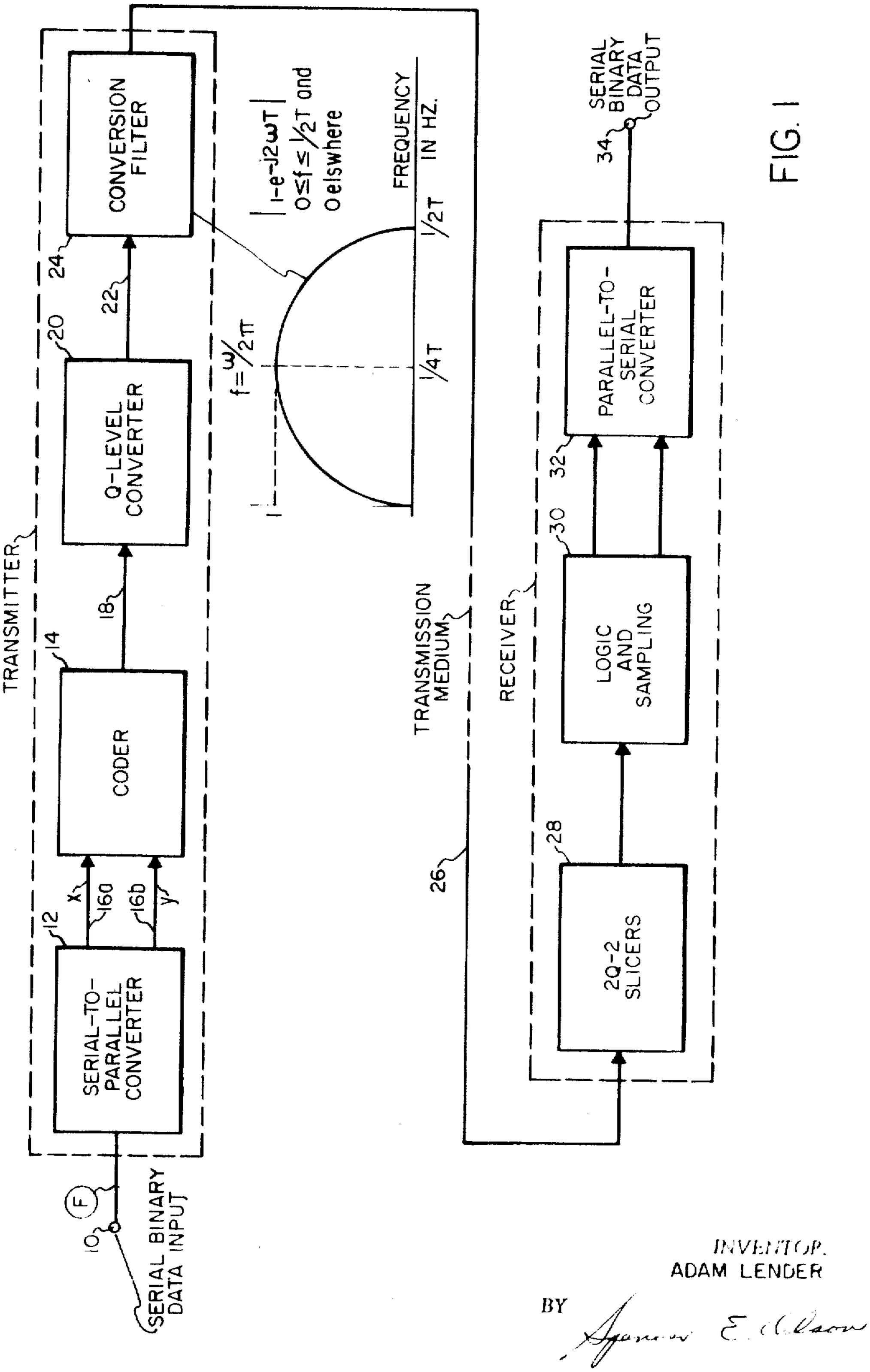
FIG. 1 is a block diagram of a data transmission system embodying the invention, including a transmitter which accepts a serial binary data input and a receiver which delivers a binary output.

Referring now to FIG. 1, there is shown, in block diagram form, a communication system including a transmitter and receiver embodying the invention. Considering first the transmitter portion of the system, binary data in serial form consisting of Marks and Spaces is applied to an input terminal 10 of a serial-to-parallel converter 12. The bit rate is $\log_2 Q/T$ bits per second (b/s), where Q and T are as previously defined. The serial-to-parallel converter 12, which may consist of a shift register, converts the serial binary input data into $\log_2 Q$ parallel binary pulse trains each having a digit rate of 1/T digits per second and a pulse duration of T seconds.

The output of serial-to-parallel converter 12 is applied over a plurality of parallel electrical circuit paths equal in number to $\log_2 Q$—in the drawing, two, designated 16*a* and 16*b*—to a coder 14, an essential and novel part of the system. From the conceptual point of view the coding procedure is nonbinary, yet the coder 14 employs binary logic. A key parameter in the coding process is the value of Q, namely, the number of nonbinary levels. Obviously, in this case Q has a value greater than two, since $Q=2$ implies a system having an inherent binary nature. In most practical systems Q is a power of two; i.e., $Q=2^n$, where *n* is an integer equal to or greater than two. Although in principle Q need not necessarily be a power of two, the most efficient bandwidth compression is achieved when Q is a power of two since such a system has a relatively simple logic. For example, the number of shift register stages in serial-to-parallel converter 12 is $\log_2 Q$; unless $Q=2^n$, the circuit implementation, although still binary, would become more complex.

The function of coder 14, a specific implementation of which will be described hereinafter, is to satisfy the equation $$B=C-\Delta^2 C \bmod Q \qquad (1)$$

wherein $\Delta^2$ indicates a delay equal to two digit intervals, and $\Delta$ indicates a single unit delay. Both $B$ and $C$ stand for nonbinary digits with $Q$ possible levels each of which represents $\log_2 Q$ binary digits. The coder 14 can be split into two units as follows:

$$B=L+\Delta L \bmod Q \qquad (2)$$
$$LC-\Delta C \bmod Q$$

Likewise, the signs in the equations for B and L can be interchanged. The equivalence of equations (1) and (2) can easily be verified by substituting L of the second equation into the first. The output of coder 14 has exactly the same form as its input, namely, $\log_2 Q$ parallel binary streams at the rate of 1/T digits per second, except that it is in coded form.

The output of coder 14 is applied over connection 18 to a converter 20 which converts each parallel group of $\log_2 Q$ binary digits into one of Q levels. The output of the converter 20 at line 22, is a nonbinary multilevel signal having Q amplitude levels, each corresponding uniquely to a group of $\log_2 Q$ binary digits at the output of coder 14. The conversion may be accomplished with known digital-to-analog converters, examples of which are described at pages 674–675 of the text "Pulse, Digital and Switching Waveforms," Millman and Taub, 1965. Considering a specific example, which will be discussed in greater detail later, if Q is equal to 8 the number of parallel binary streams is $\log_2 8$, or 3, and each nonbinary digit at the output of converter 20 represents three of the parallel coded binary digits. In this example, there are eight combinations of the binary digits, e.g., 000, 001, 011 etc., and each is uniquely represented by one of the eight amplitude levels.

This coded nonbinary signal is applied via connection 22 to a conversion filter 24, which, as has been noted earlier, has a characteristic which is a half-cycle sinusoid with zero transmission at DC and at an upper frequency that is numerically equal to one-half of the nonbinary digit rate at the input to the filter. This characteristic, shown adjacent the filter, expressed mathematically is of the form $-e^{-j\omega}$ from 0 to 1/2T Hz. The effect of a filter having this characteristic is to subtract each second previous digit from the present nonbinary digit, in addition to shaping the waveform. As a result, there are (2Q−1) levels at the output of filter circuit 24, each of which uniquely corresponds to a group of $\log_2 Q$ parallel binary digits at the output of serial-to-parallel converter 12. This is the correlative nonbinary wave which has a digit rate of 1/T, and which is applied to a suitable transmission medium 26 for transmission to a remote receiver. The transmission medium may take a variety of forms, such as cables or carrier systems providing telephone voice channels.

A receiver at the remote end of the transmission medium 26 shown in the lower half of FIG. 1, recovers the intelligence contained in the serial binary data applied to terminal 10 of the transmitter. Because of the unique correspondence of each nonbinary correlative digit at the output of conversion filter 24 with a group of binary digits at the output of converter 12, the original information is recovered relatively simply using straightforward logic principles. The first step in the detection process is to determine, during each digit interval, the amplitude of the multilevel nonbinary waveform. This is accomplished by applying the input signal to a slicer circuit 28 having a number of slicing levels equal to (2Q−2), which it will be noted, is one less than the number of levels of the signal delivered by conversion filter 24. The outputs of the slicer, which in the specific implementation to be described are in binary form, are combined by known logic gates 30 to obtain $\log_2 Q$ parallel binary waveforms which correspond to the $\log_2 Q$ binary waveforms appearing at the output of converter 12 of the transmitter. These parallel binary waveforms are applied to a parallel-to-serial converter 32 which converts the parallel waveforms to serial binary data form so that a replica of the original binary data applied to input terminal 10, and having a bit rate of $\log_2 Q/T$, appears at output terminal 34.

The just-described concepts of the invention will be better understood from the following detailed description of a specific implementation and operation using a typical data input rate. For convenience of analysis and understanding, an input serial binary data rate of 2/T bits per second will be assumed; i.e., Q=4 and $(\log_2 4)/T$ is 2/T. It was previously shown that serial-to-parallel converter 12 converts the input binary data stream into $\log_2 Q$ output data streams each having a digit rate of 1/T. This digit rate is the same for all values of Q that would be used in practical applications, it being recalled that $Q=2^n$, where $n$ is an integer having a value of 2 or greater. Thus, for Q=4, the output from converter 12 consists of two separate binary signals, each at a data rate of 1/T, or one-half the data rate of the input serial binary data. This is diagrammatically illustrated in the timing diagram of FIG. 3, the input wave having a data rate of 2/T being represented by waveform F, and the two separate binary data streams at the 1/T rate being represented by waveforms $x$ and $y$, which together are represented at G. Thus, at the output of converter 12 each of the four possible levels is represented by two parallel binary digits.

Before describing specific circuitry for accomplishing it, the process of coding the parallel binary data streams applied to coder 14 must, as was noted earlier, satisfy the following equation in order to introduce the desired memory:

$$B=C-\Delta^2 C \bmod Q \qquad (1)$$

the elements of the equation having been described previously. For simplicity, the process will be described using equation (1) in the form $C=B+\Delta^2 C \bmod Q$. As noted earlier, in a practical system the input signal B usually would be parallel binary data—not a nonbinary signal; consequently, the various conditions that will satisfy equation (1) must be stated in binary form. In the example to be described, Gray coding is used to change from nonbinary to binary so that 0, 1, 2, 3, are 00, 01, 11, and 10, respectively. The following Table I lists all of the conditions rewritten for use in the binary format, for all possible combinations of $C=B+\Delta^2 C \bmod Q$, where $Q$ is equal to 4.

TABLE I

| | | | | | | | | | | | | | | | | | |
|---|---|---|---|---|---|---|---|---|---|---|---|---|---|---|---|---|---|
| B− | X | 0 | 0 | 0 | 0 | 0 | 0 | 0 | 0 | 1 | 1 | 1 | 1 | 1 | 1 | 1 | 1 |
| | Y | 0 | 0 | 0 | 0 | 1 | 1 | 1 | 1 | 1 | 1 | 1 | 1 | 0 | 0 | 0 | 0 |
| $\Delta^2C$− | Z | 0 | 0 | 1 | 1 | 0 | 0 | 1 | 1 | 0 | 0 | 1 | 1 | 0 | 0 | 1 | 1 |
| | W | 0 | 1 | 0 | 1 | 0 | 1 | 0 | 1 | 0 | 1 | 0 | 1 | 0 | 1 | 0 | 1 |
| C− | $C_1$ | 0 | 0 | 1 | 1 | 0 | 1 | 0 | 1 | 1 | 1 | 0 | 0 | 1 | 0 | 1 | 0 |
| | $C_2$ | 0 | 1 | 0 | 1 | 1 | 1 | 0 | 0 | 1 | 0 | 1 | 0 | 0 | 0 | 1 | 1 |

The next step is to translate the binary representation in Table I into physical circuits which will perform the desired logic, the objective being to perform the coding with a minimum of logic gates. The binary representations X and Y in Table I are the two binary streams produced by converter 12 from the serial binary data input; these are shown as waveforms X and Y, respectively, at (G) in FIG. 3. The binary representations Z and W (Table I) are respectively the coded binary outputs $C_1$ and $C_2$ from coder 14, delayed by two digit intervals, $\Delta^2$. The corresponding waveforms are shown at (H) and (I), respectively, of FIG. 3.

One method of minimizing the number of logic gates in coder 14 is by use of the map method described by M. Karnaugh in the article entitled "The Map Method for Synthesis of Combinational Logic Circuits" appearing at pages 593–599 of *A.I.E.E. Transactions, Part I: Communications and Electronics, Vol.* 72, *Nov.* 1955. Applying the Karnaugh method, the coding in accordance with equation (1) and Table I can be expressed by:

$$C_1=XZ'W'+YZ'W+X'ZW+Y'ZW' \qquad (3)$$
$$C_2=XZW'+X'ZW+X'Z'W+YZ'W'$$

Figure 2:
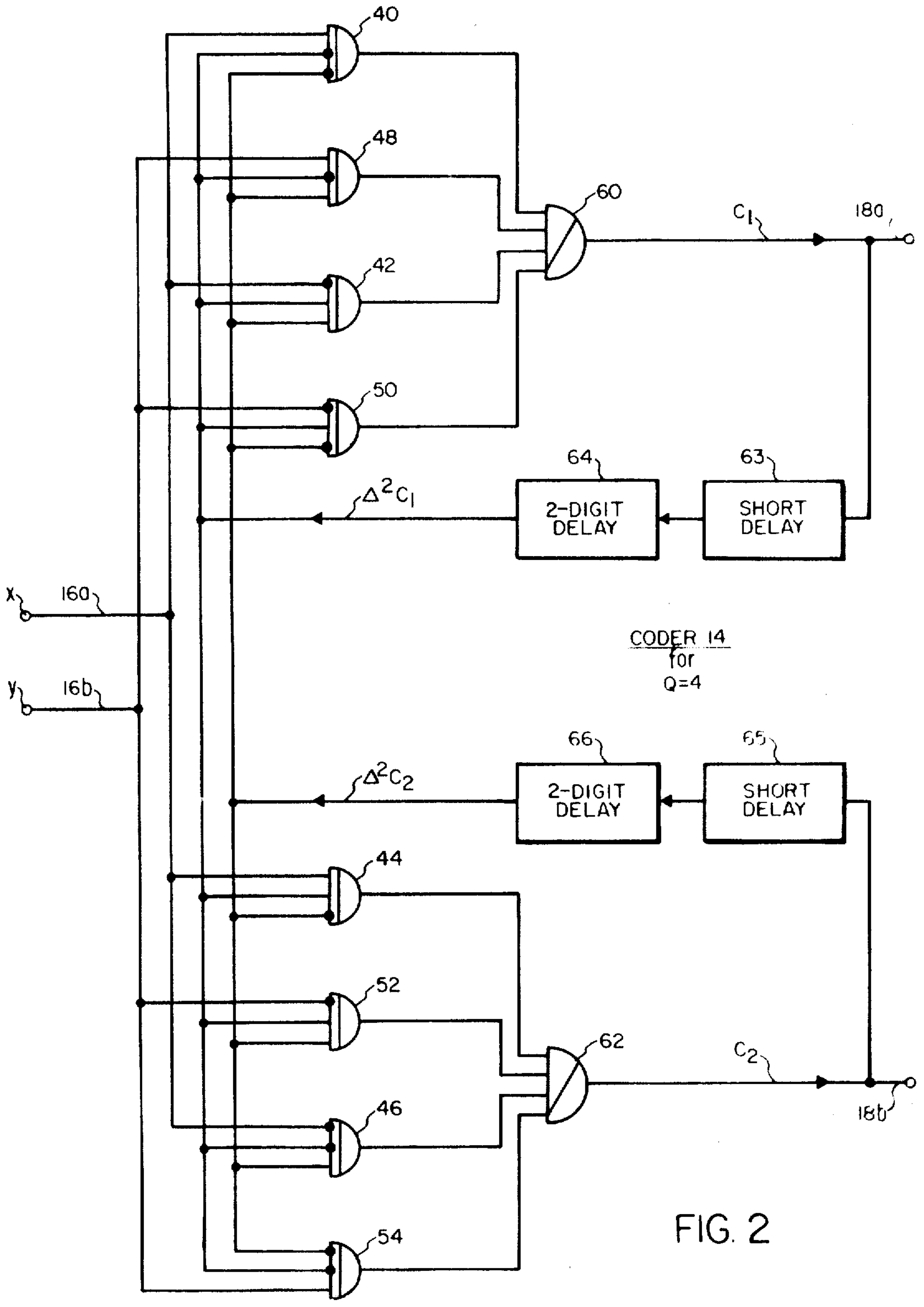
FIG. 2 is a logic diagram of the coder of the transmitter of FIG. 1, for $Q=4$.

Expression (3) indicates that coding can be accomplished by simple AND-OR logic circuits. The primes indicate negation or complement. It should be noted that:

$X$ = most significant digit of $B$
$Y$ = least significant digit of $B$
$Z=\Delta^2 C_1$ = most significant digit of $\Delta^2 C$
$W=\Delta^2 C_2$ = least significant digit of $\Delta^2 C$
$C_1$ = most significant digit of $C$
$C_2$ = least significant digit of $C$ A circuit arrangement capable of performing the coding corresponding to expression (3) and representing coder 14 for Q=4 is shown in FIG. 2. While this circuitry is more complex than is normally encountered in binary systems, it lends itself to implementation with integrated circuits since it consists only of binary elements. The implementation follows expression (3in that four AND-gates are required for the expression $C_1$ and four are required for the expression $C_2$. As shown, there are four AND-gates associated with each of the input lines 16*a* and 16*b* to which signals corresponding to $C_1$ and $C_2$ are respectively applied, gates 40, 42, 44 and 46 being associated with $C_1$, and gates 48, 50, 52 and 54 being associated with $C_2$. Each AND-gate has three inputs as indicated; it will be noted that gate 40, for example, has two inhibit inputs, whereas gate 48, for example, has only one inhibit input. For reasons which will appear later, the outputs of gates 40, 48, 42 and 50 are applied to an OR-gate 60, and the outputs of gates 44, 52, 46 and 54 are applied to OR-gate 62. The output of OR-gate 60 is applied to output line 18*a* and is also applied, after being delayed by a two-digit interval by a delay circuit 64 which preferably takes the form of a two-stage shift register, to one input of each of the AND-gates. Similarly, the output of OR-gate 62 is applied to output line 18*b* and is also delayed by a two-digit interval by a similar delay circuit 66 and applied to an input of each of the AND-gates. The pulse from OR-gate 60 is subjected to a short delay, prior to application to delay circuit 64, by an RC delay network or the like, indicated by block 63. The purpose of the short delay is to insure that the contents of the stages of the two-stage shift register 64 are shifted to the left, under control of a clock (not shown), prior to receipt of the incoming pulse. The pulses appearing at output line **18*b* are similarly delayed before application to delay circuit 66 by a similar delay network 65**. The process achieves a particular combination of the two binary input signals with the delayed form of the two output signals.

Figure 3:
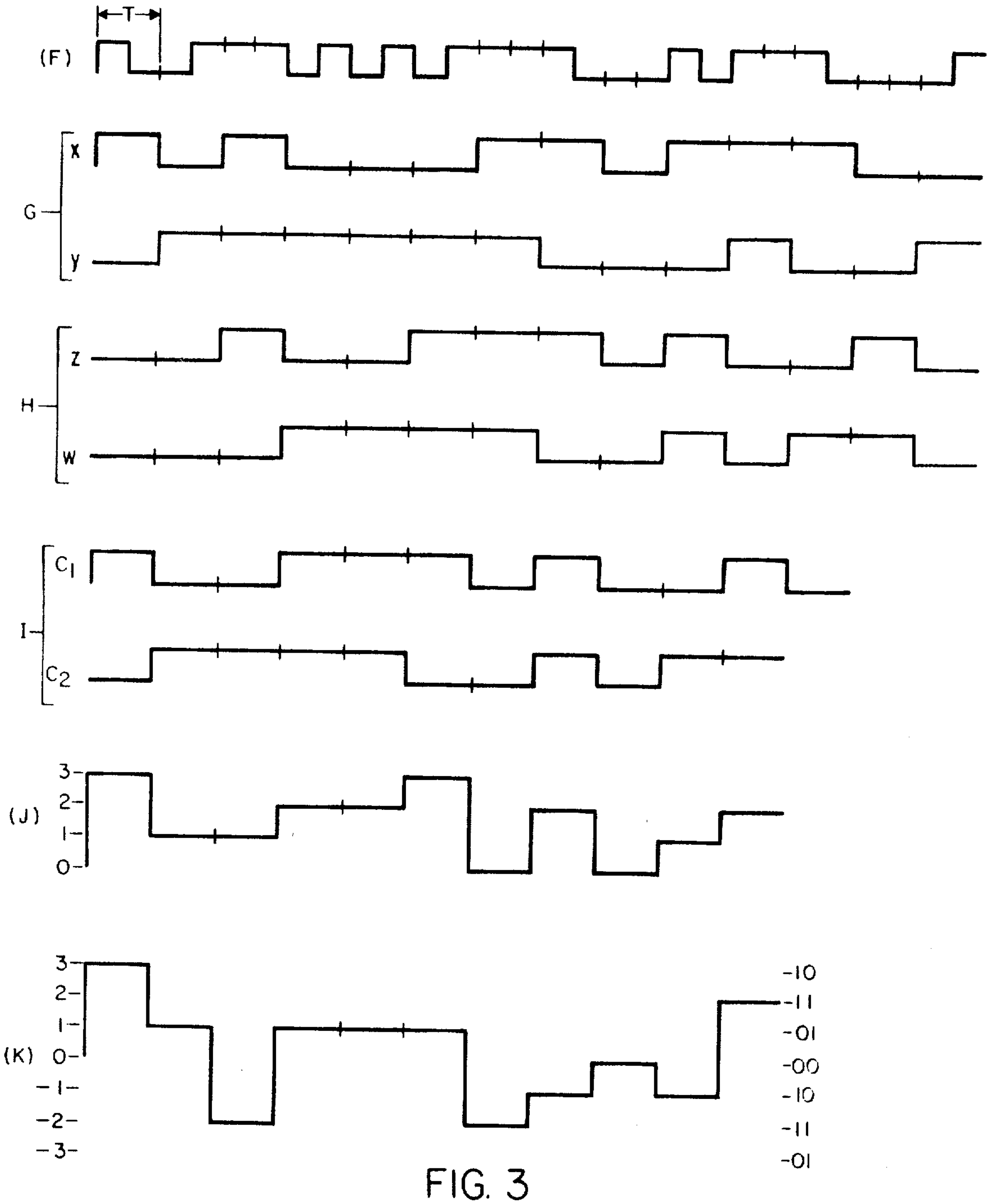
FIG. 3 is a timing diagram illustrating the relationship of the waveforms at various points in the transmitter of FIG. 1.

Operation of the coder can be best understood by following its effect on the particular binary input signal shown in FIG. 3. As has been described previously, the binary input signal shown at (F) is first changed, in serial-to-parallel converter 12, into two binary signals each having a bit rate of 1/T bits per second as shown at X and Y at (G) in FIG. 3. As indicated, the X signal is applied to lead **16*a* and the Y signal is applied to input lead 16*b*. The states of Z and W in expression (3) of course depend upon the past history of the output waveforms $C_1$ and $C_2$, respectively, making it necessary to assume certain starting conditions. For example, on start-up the prior states of $C_1$ and $C_2$ may be assumed to be as shown in H of FIG. 3. This assumption is made for simplicity as any initial state of Z and W is possible and permissible for the coding process. As noted earlier, the necessary two-digit delay for each coded binary signal is accomplished by delay circuit 64 for $C_1$ and delay circuit 66** for $C_2$. For the present example of Q=4, this delay can be introduced by a two-stage shift register. The conditions of Z and W are shown at (H), and it should be noted that these are respectively the waveforms $C_1$ and $C_2$ shown at (I) delayed by two digits.

As shown in FIG. 3, the initial state of X is 1 and the initial state of Y is 0. With the 1 applied to input **16*a* it appears at the input of AND-gate 40, the inhibit input of gate 42, the input of gate 44 and the inhibit input of gate 46. The inhibit inputs of gates 42 and 46 cause the 1 to appear thereat as a 0. Since the AND-gates are arranged to operate only when each input has an effective 1 state, neither of gates 42 or 46 will supply an output pulse during the first digit interval. AND-gate 40, however, has inhibit inputs from both delay circuits 64 and 66 (Z and W, respectively of equation (3)) both of these inputs being in the 0 state as they are applied to the inhibit inputs of AND-gate 40. Thus, gate 40 delivers an output in the 1 state which passes through OR-gate 60 and appears as a pulse on the $C_1$ output lead 18*a***. The digit rate of this pulse, controlled by a suitable timing clock (not shown) is 1/T. It is apparent that none of the other AND-gates has an output during this digit interval with the result that $C_2$ remains in the 0 state.

During the next digit interval, the state of X is 0 but the state of Y is 1. Following the just-outlined analysis, an output will occur only at AND-gate 54 causing a 1 state to pass through OR-gate 62 and appear as a pulse, at a digit rate of 1/T, on the $C_2$ output lead **18*b***.

During the third digit interval, both X and Y are in the 1 state, and the $C_1$ output pulse that appeared during the first digit interval will have been delayed by two digits and will appear as a 1 state at the output of delay circuit 64. Because of the latter condition, AND-gate 40 will not have an output, and, therefore, no pulse will occur at output lead **18*a*, and $C_1$ will be 0 during this third interval. However, the 1 states occurring at the input 16*a* and at the output of the delay circuit 64 are applied to AND-gate 44, along with the 0 state from delay 66, the latter being applied to the inhibit input to gate 44, with the result that gate 44 has an output which passes through OR-gate 62 and appears as a pulse on the $C_2$ output lead 18*b***.

Continuing this analysis for all of the illustrated digit intervals, the waveforms $C_1$ and $C_2$ shown at (I) will appear on output leads **18*a* and 18*b***, respectively. This coded output is still in binary form, and, for the present Q=4 example, there are two separate pulse trains.

The next step is to combine the two coded binary signals in converter 20 so as to produce a nonbinary signal bearing a particular relationship to the binary signals. The converter 20 employs a known form of digital-to-analog conversion and, in this example, follows the Gray coding approach, although other techniques may be employed. As was noted earlier, when Gray coding is used the relationship between the binary outputs from the coder and the amplitude levels from the converter are 00, 01, 11 and 10 to 0, 1, 2, 3, respectively. That is, in the first digit interval of waveform (J), which is the output of the digit-to-analog converter 20, the level is 3, corresponding to the 1 and 0 states, respectively, of $C_1$ and $C_2$. Thus, in the present example where, in the first digit interval, the state of $C_1$ is 1 and the state of $C_2$ is 0, the amplitude of the analog signal is 3. Similarly, in the second digit interval when $C_1$ is 0 and $C_2$ is 1, the amplitude of the output nonbinary signal is 1.

The nonbinary signal (*j*) is next applied to a conversion filter having the sinusoidal characteristic shown in FIG. 1 and described hereinabove. The filter characteristic is ideally expressed mathematically as $|1-e^{-j2\omega T}|$ over the frequency interval 0 to 1/2T Hz. and zero elsewhere; however, this ideal characteristic is not actually realizable in practical filters. In practice, however, the characteristic need only approximate the ideal mathematical expression in order for the correlation property to be obtained. It is rather easy to show from analysis of the mathematical expression how the filter performs the subtraction process. The first part of the expression, namely the "1," represents the present waveform. The exponential term represents the delayed waveform and the 2T portion of the exponent expresses the amount of delay. Taking the minus sign into account, the filter causes subtraction of the delayed waveform from the undelayed waveform, and the delayed wave is delayed by a time interval of 2T, or two digit intervals. The output waveform is thus the difference between the present waveform and the waveform delayed by two digit intervals. The output waveform, shown at (K) in FIG. 3, has, as was explained previously, (2Q−1) levels, and since Q=4 in the present example, the number of levels is seven, ranging from −3 through zero to +3. Each level represents a unique combination of $\log_2 Q$ binary digits of the original serial binary waveform, the relationship between the level and the original binary information being given in the following table:

TABLE II

| | | | | | | | |
|---|---|---|---|---|---|---|---|
| Nonbinary Signal Output (K in FIG. 3) | −3 | −2 | −1 | 0 | 1 | 2 | 3 |
| Parallel Binary Equivalent | 01 | 11 | 10 | 00 | 01 | 11 | 10 |

A comparison of waveforms (K) and (F) will show that each level of waveform (K) represents a particular combination of $\log_2 Q$ (i.e., two) binary digits in the original waveform.

Waveform (K) is idealized in that pulses are shown in rectangular form for simplicity, but in practice there would be shaping due to the frequency bandwidth limitation of the band-pass filter characteristic which is sinusoidal from 0 to 1/2T Hz. and zero elsewhere. Thus, in an actual system, the output would differ from that illustrated in the sense that the rectangular corners would be shaped and smooth. In addition to this change in shape, the waveform (K) would be delayed—displaced in time—from waveform (J) or the preceding waveforms owing to the absolute delay in the physical band-pass filter as well as in the logic circuits. However, in order to permit a direct comparison of waveforms without regard to the number of processing steps, the time difference that would separate the waveforms has been eliminated in the timing diagram of FIG. 3. Thus, a slight inaccuracy is the sacrifice that has been made in order to achieve simplification of the drawings and the associated description.

The signal derived from converter 24 may be transmitted as a baseband signal, or used to modulate a carrier signal in either orthogonal or single sideband form. After transmission over a suitable medium 26, the signal appearing at the input to the receiver (after demodulation if carrier modulation is used) has seven levels ranging in amplitude from −3 to 3. The interpretation of the seven-level waveform is modulo 4 so that the levels uniquely correspond to the parallel binary representation without resorting to the past history of the waveform. In order to recover the information at the receiver, it is first necessary to determine the amplitude level of the nonbinary signal at the sampling point. This is readily accomplished by well-known slicing techniques, it being apparent that the number of slicers required is one less than the number of levels; i.e., (2Q−2). In the present illustrative example, the required number of slicers is six. Being well known, it is believed unnecessary to describe a specific implementation of the slicers represented by block 28 in FIG. 1; suffice it to say, that the slicers may be on-off threshold level detectors which establish slicing levels midway between adjacent amplitudes as shown by the dashed lines in FIG. 4. Recovery of the original data information is based upon simple logic, which is consistent for any value of Q, according to the following rules:

(1) At the extreme levels, namely, at 3 and −3, only the adjacent slicer is involved. For the uppermost level, 3 in the illustrated example, the adjacent slicer must have an output; i.e., slicer *f* must have an output. Similarly, for the lowermost level −3 in this example, the adjacent slicer *a* must not have an output. (2) At levels intermediate these two extremes, the two slicers adjacent to the intermediate level of interest are involved, and, more specifically, the slicer above the intermediate level in question must not have an output and the slicer below said level must have an output.

Relating these rules to the present example, the logic is illustrated in the following table:

TABLE III

| Level | Binary Representation | Slicing Logic * |
|---|---|---|
| 3 | 10 | *f* |
| 2 | 11 | *ef* |
| 1 | 01 | *de'* |
| 0 | 00 | *cd'* |
| −1 | 10 | *bc'* |
| −2 | 11 | *ab'* |
| −3 | 01 | *a'* |

* Primes indicate negation

Figure 4:
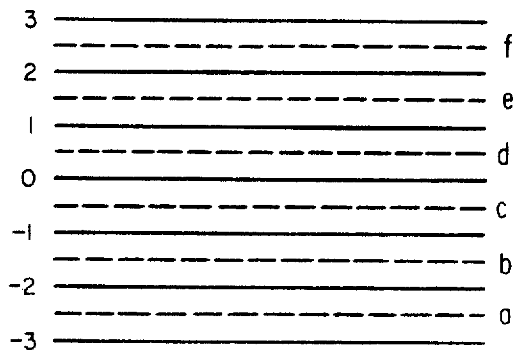
FIG. 4 is a diagram illustrating the slicing levels of the slicers in the receiver of FIG. 1.
Figure 5:
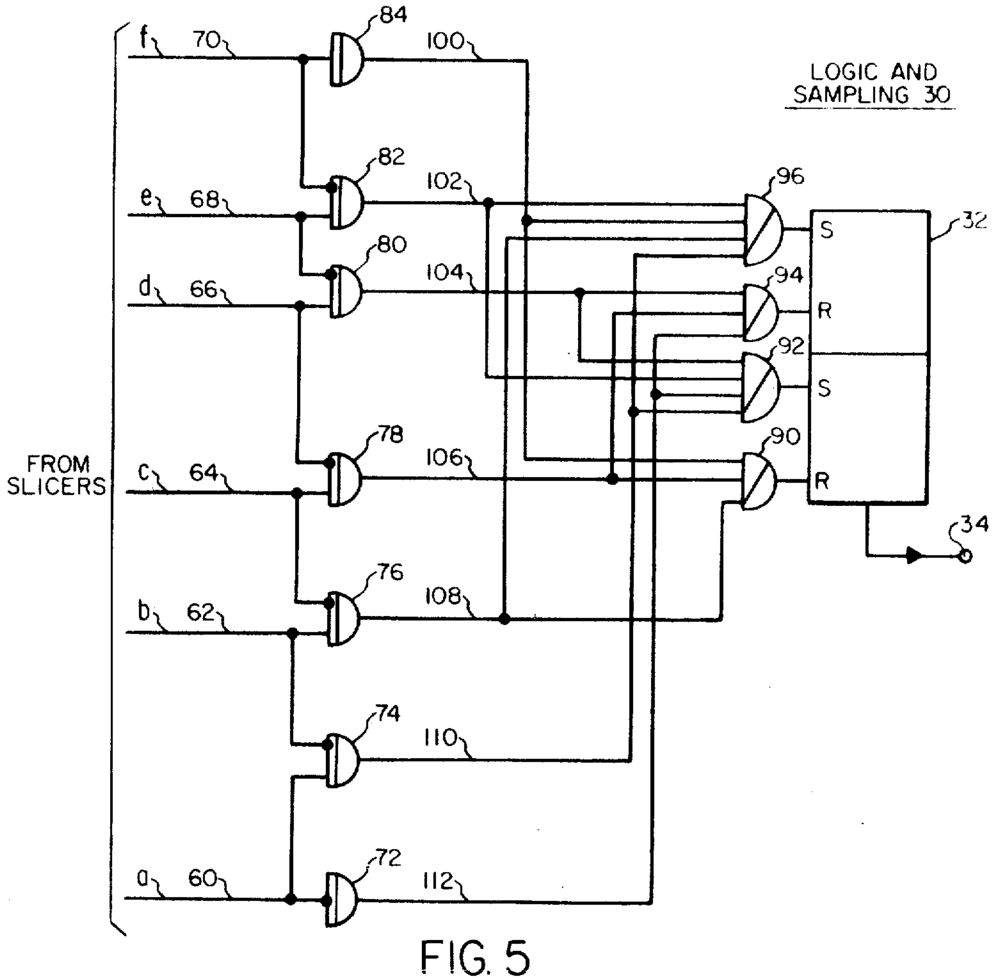
FIG. 5 is a diagram of the logic and sampling and parallel-to-serial converter of the receiver of FIG. 1.

A circuit implementing the logic required for recovery of the information is shown in FIG. 5. The slicers are conventional on-off threshold detectors, not shown in FIG. 5, the outputs from the six slicers being designated by letters *a* through *f*, corresponding to the slicing levels shown in FIG. 4, and applied to input leads 60, 62, 64, 66, 68 and 70, respectively. It will be evident from the rules noted above and from Table III that the logic involved in the recovery of binary information must include an AND-gate for each slicing level plus one additional AND-gate; i.e., the number of AND-gates is equal to 2Q−1, or seven in the present example. Accordingly, there are provided seven AND-gates 72, 74, 76, 78, 80, 82 and 84 to which input leads 60 through 70 are respectively connected. For the extreme levels, namely, *a* and *f*, the associated gates 72 and 84, respectively, require only a single input, an inhibit input in the case of gate 72 and a normal input for gate 84. For the intermediate levels, each gate has two inputs, one of which is an inhibit input, one each from adjacent slicing levels, in order properly to identify the level. For example, in the case of AND-gate 80, the output from the *d*-slicer is applied to one input and the output from the *e*-slicer (the next highest level) is applied to the inhibit input.

In order for AND-gate 72 to have an output, the input from level *a* during the digit time interval must be zero, because the *a* input is applied to an inhibit input of this gate as indicated. The timing interval is set by a clock (not shown) operating at a rate of 1/T digits per second, connected to each AND-gate. The clock and the parallel connections to the several gates have not been illustrated in order to simplify the drawing.

The logic also includes four OR-gates 90, 92, 94 and 96 and connections from each of the seven AND-gates to two of the four OR-gates. The number of OR-gates required is equal to $2\log_2 Q$ since one OR-gate must supply the SET and one must supply the RESET input of each of the two stages of a parallel-to-serial converter 32. The connections between the AND-gate outputs and the OR-gate inputs are so selected that stages of the converter will provide the serial binary output in accordance with the level and binary representation given in Table III.

How this is accomplished will be better understood by observing the operation of the receiver logic on the nonbinary input signal for the first three pulses of waveform (K) of FIG. 3. The first pulse is at level +3 with the consequence that the slicers will show outputs at all six levels. AND-gates 72 through 82 will not, however, have outputs under these conditions because a 1 is applied to each input and the inhibit inputs prevent operation of these gates. However, AND-gate 84 has a 1 output on its output lead 100 which is applied in parallel to OR-gates 90 and 96. The output of OR-gate 90 is connected to the RESET input of one stage and the output of OR-gate 96 is connected to the SET of the other stage of the two-stage parallel-to-serial converter 32. As a result, the serial output appearing at the output terminal 34, resulting from the SET and RESET of the first and second stages of parallel-to-serial converter 32, is 10. This corresponds to the 2/T b/s serial binary data input at the transmitter during the first digit interval T.

Referring again to waveform (K), during the second digit interval the level is +1, which, as is evident from FIG. 4, lies between slicing levels *e* and *d*. In keeping with the slicing logic specified in Table III, for this condition only AND-gate 80 has a 1 output. This output is applied in parallel to the inputs of OR-gates 92 and 94, the outputs of which are respectively connected to the SET and RESET of the second stage of converter 32. Now the serial binary output at terminal 34 is 01, which again corresponds with the original binary input for the corresponding time interval.

Similarly, during the third time interval of waveform (K), during which the level is −2, only AND-gate 74 has an output; the output of this gate is applied in parallel to the inputs of OR-gates 92 and 96. The outputs of these OR-gates being connected to the SET inputs of both stages of converter 32, the resultant serial binary output at terminal 34 is a pair of successive binary one's (11), which corresponds directly with the input data at the transmitter.

From the foregoing analysis of three digit intervals of the nonbinary waveform (K) it will be evident that the other AND-gates not specifically described but each of which has its output applied in parallel to two of the four OR-gates will perform similarly to accomplish recovery of the transmitted data without reference to the past history of the waveform.

The ratio of the input speed to the bandwidth available determines the speed capability of this system and is ($2\log_2 Q$) b/s per Hz. For values of Q of 4 and 8, for example, the speed capabilities are respectively 4 and 6 bits per cycle of bandwidth with seven and 15 levels, respectively. Compared for example to a multilevel vestigial sideband system with 50 percent rolloff, the same speed capabilities would require 16 and 64 levels for the vestigial system. In terms of voice channels that have a 2,400 Hz. bandwidth, the present system accommodates 9,600 b/s with seven levels and 14,400 b/s with 15 levels.

Because of the correlation properties of the nonbinary correlative waveform generated at the transmitter, errors due to irregularities and impairments in the transmission facility may be detected where these errors violate the correlation patterns of waveform (K). This permits detection of most errors without reducing the bit rate obtained by the present improved data processing method. Errors are not corrected, but only detected, since the time of occurrence of error is not determined by the error detection process. The general principle of detection, to be described more fully hereinafter, is based on the fact that the two extreme levels of the transmitted waveform can only be formed in its own unique way. The manner in which this principle is applied is illustrated in and will now be described in connection with FIG. 6.

Since the detection process is based on detection of violations of correlative waveforms, the error detection circuitry relies for its operation on inputs from the slicers 28 and the logic and sampling circuitry 30 of the receiver. The logic and sampling circuit 30 provides outputs which are replicas of the $\log_2 Q$ parallel binary data streams at the output of converter 12 (FIG. 1) except for errors that might have occurred during transmission. These parallel binary data streams are applied to a coder 14', which may be implemented in exactly the same way as coder 14 in the transmitter, and operates in the same way. The useful results of this process are the provision of coded binary signals and their delayed counterparts at the output of coder 14', equivalent of the signals $C_1$, $C_2$, Z and W, previously discussed in connection with the description of the transmitter. These coded binary signals are used to establish the effective presence or absence of the top or bottom levels that would result from the formation of a nonbinary correlative signal such as waveform (K) of FIG. 3. If an error has occurred during transmission, the extreme levels of the locally generated signal will not normally coincide with those of the received signal.

To determine if an error has occurred it is necessary to compare the extreme levels of the incoming waveform at 26 with those locally generated. The outputs of coder 14', equivalent to coded binary outputs $C_1$ and $C_2$, for example, at the transmitter, are applied in parallel to a comparison circuit 120 and to a memory circuit 122. Memory circuit 122 functions to produce outputs equivalent to Z and W, for example, (FIG. 3) which are also applied to comparison circuit 120. These inputs to the comparison circuit are the ingredients that form the equivalent of a nonbinary correlative signal. The occurrence of extreme levels of this equivalent signal are compared with the outputs of the top and bottom slicers 28, and when occurrences of extreme level of the two signals differ in time is an indication that an error has occurred. The error indication results in an output pulse on lead 124, which may be connected to an error counter or other error indicating device. The error output is also applied to memory 122 for resetting the memory to agree with the extreme level information of the received wave.

As has been noted a number of times earlier, each of the (2Q−1) levels on line 26 represents $\log_2 Q$ binary digits. An error implies that the particular level at the sampling instant is not the level that was originally transmitted. Since each level represents $\log_2 Q$ binary digits, such an error results in, at most, $\log_2 Q$ erroneous bits. To avoid confusion in the terminology used herein, it should be noted that a single error is an error of only one bit or more, up to as many as $\log_2 Q$ bits, as a result of incorrect interpretation of the amplitude of a particular level. A double error may imply just two bits, or as many as $2\log_2 Q$ bits in error.

Figure 6:
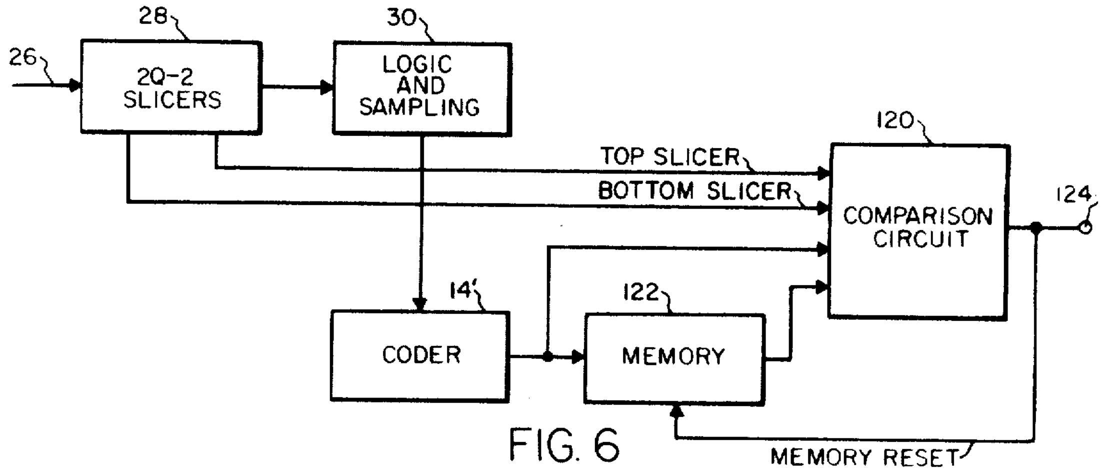
FIG. 6 is a block diagram of an error detection system useful with the receiver of FIG. 1.
Figure 8:
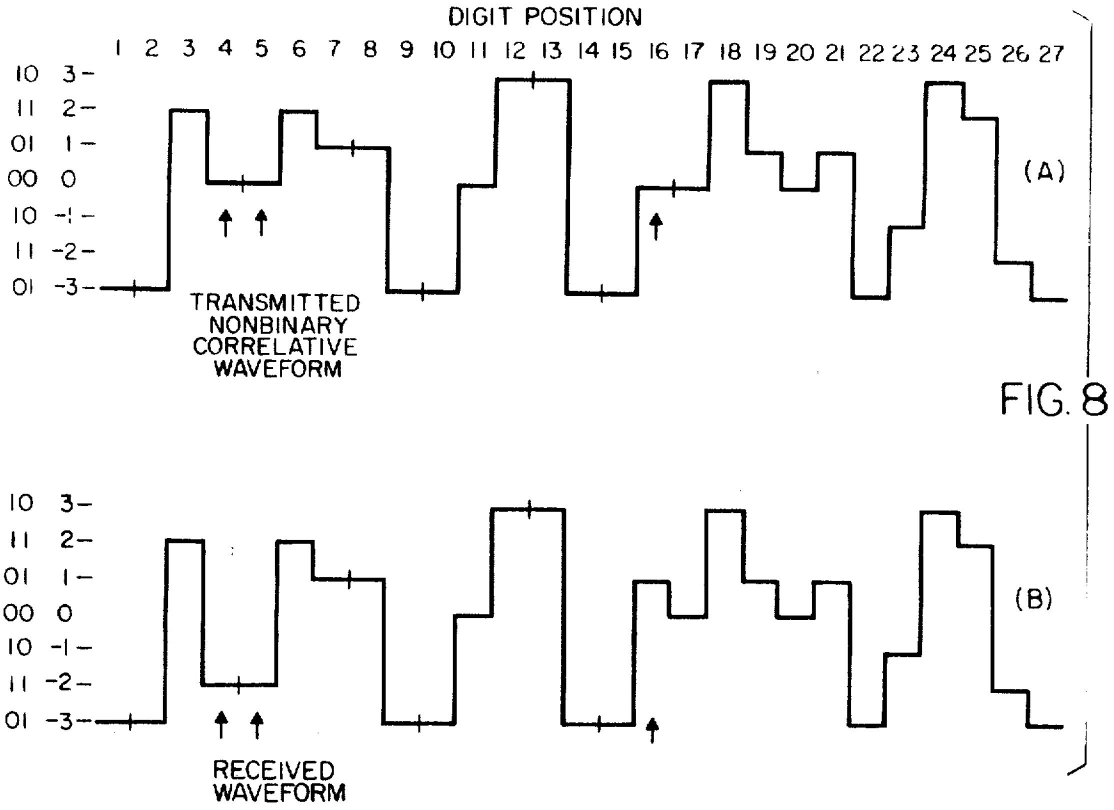
FIG. 8 is a diagram of nonbinary correlative waveforms found in and useful in explaining the operation of the error detection system of FIG. 7.

The error detection principles generally described in connection with FIG. 6 will be better understood from the following description of the specific embodiment of the error detection circuit illustrated in FIG. 7. Here again, the implementation is for a value of Q=4; i.e., a seven-level nonbinary correlative system. The operation of the circuit will be described in connection with the two seven-level waveforms depicted in FIG. 8, the first (A) of which is the transmitted wave generated by the correlative process at the transmitting end, and the second (B) is the received waveform which contains a double error—at digit positions 4 and 5, and a single error at digit position 16.

The received seven-level nonbinary correlative signal is applied over line 26 to the slicers 28 of the receiver which provide the extreme level information input to the error detector. Whenever a maximum, or top, amplitude occurs, an output appears on output line 130. When the lower level—bottom—occurs, no output appears on output line 132, but this absence of output is converted into a pulse by an inverter 134 so that the lower extreme level of the incoming waveform can be readily compared with that which is locally derived from the received waveform.

The locally generated nonbinary correlative signal is obtained by a processing method similar to that used at the transmitter. Rather than converting a serial binary signal into $\log_2 Q$ parallel binary data streams, use is made of the availability of the parallel binary data streams in the logic and sampling circuitry 30 of the receiver.

In addition to the serial binary output at the high-speed rate, the parallel binary digits at a rate of 1/T digits per second are present on paths 136 and 138, these parallel binary signals being the equivalent of those derived from the serial binary input at the transmitter. In fact, if no errors occurred during transmission of the information, the parallel binary data streams would be identical to those at the transmitter except that they would occur later in time.

The presence of errors causes the parallel outputs on leads 136 and 138 to be different from that transmitted. Using a coding process similar to that employed at the transmitter, coded binary signals $C_1'$ and $C_2'$, as well as the delayed forms of these signals, $\Delta^2 C_1' = Z'$ and $\Delta^2 C_2' = W'$ are obtained. Where similarity with the transmitter designations is indicated by the same basic symbols $C_1$, $C_2$, etc., the symbols are distinguished by the use of primes to identify their derivation at the receiver. The coder, comprising AND-gates 40' through 54', OR-gates 62' and 64', and two delay circuits 64' and 66', is identical to that shown in FIG. 2 and performs the same coding operation. Comparing this specific embodiment with the general error detection system of FIG. 6, the coder 14' would comprise the just described AND- and OR-gates, gates, and delay circuits 64' and 66' would be the equivalent of memory 122. The comparison circuit 120 of FIG. 6 consists essentially of a pair of OR-gates 140 and 142, two AND-gates 144 and 148, and their associated input and output circuit paths, which includes the extreme level inputs applied over paths 130 and 132.

The coded binary outputs from OR-gates 60' and 62', and the delayed coded binary outputs from delay 64' and delay 66' are applied to both the top OR-gate 140 and the bottom OR-gate 142. The output of OR-gate 140 constitutes one input of AND-gate 144, the second coming from the top slicer over connection 130. A pulse at each input to gate 144 indicates that an error has occurred, causing an error indicator pulse to be applied to one input of OR-gate 146. Similarly, an error indicator pulse may result from the comparison of the derived coded pulse with the occurrence of a bottom slicer indication. In this case, an output from OR-gate 142 is applied to one input of AND-gate 148, and the output of inverter 134 indicating an absence of a pulse from the bottom slicer, is applied to the other input of gate 148. The simultaneous occurrence of the pulse at each input of gate 148 indicates that an error has occurred, resulting in an error indicator pulse which is applied to OR-gate 146.

The presence of an error indicator pulse at the output of either of gates 144 or 148 means that the coded binary signals derived at the receiver do not agree with the top or bottom levels of the received waveform, necessitating that the output of the coder be restored to the correct position. If the error causes an output error indicating pulse from AND-gate 144, the error pulse is applied simultaneously to delay circuit 64' and to one input of an OR-gate 150. The output of OR-gate 150 is connected to delay circuit 66'. Similarly, if the error results in an output error pulse from AND-gate 148, it is applied simultaneously to the other input of OR-gate 150 and to delay circuit 64'.

Reverting again to FIG. 8, a clearer understanding of the operation of the error detection method will be had by following the step-by-step processing of the received waveform shown at B. As noted earlier, the received waveform has a double error at digit positions 4 and 5 and a single error at digit position 16. Since each digit position represents two serial binary digits, each error occurrence could mean that a maximum of two digits are in error. By reference to Table II and the waveforms of FIG. 8, it is evident that the received levels for digit positions 4 and 5 would indicate that the binary representations should be 11 for each position. However, a similar examination of the transmitted waveform A indicates that the original binary data was 00 for each position. Thus, both digits would be incorrectly interpreted at the receiver, resulting in a double digit error which for this case is equivalent to four bit errors. For the level error at digit position 16, the binary representation is 01 instead of the 00 transmitted. As a result, one digit is in error, resulting in only one bit error.

Figure 7:
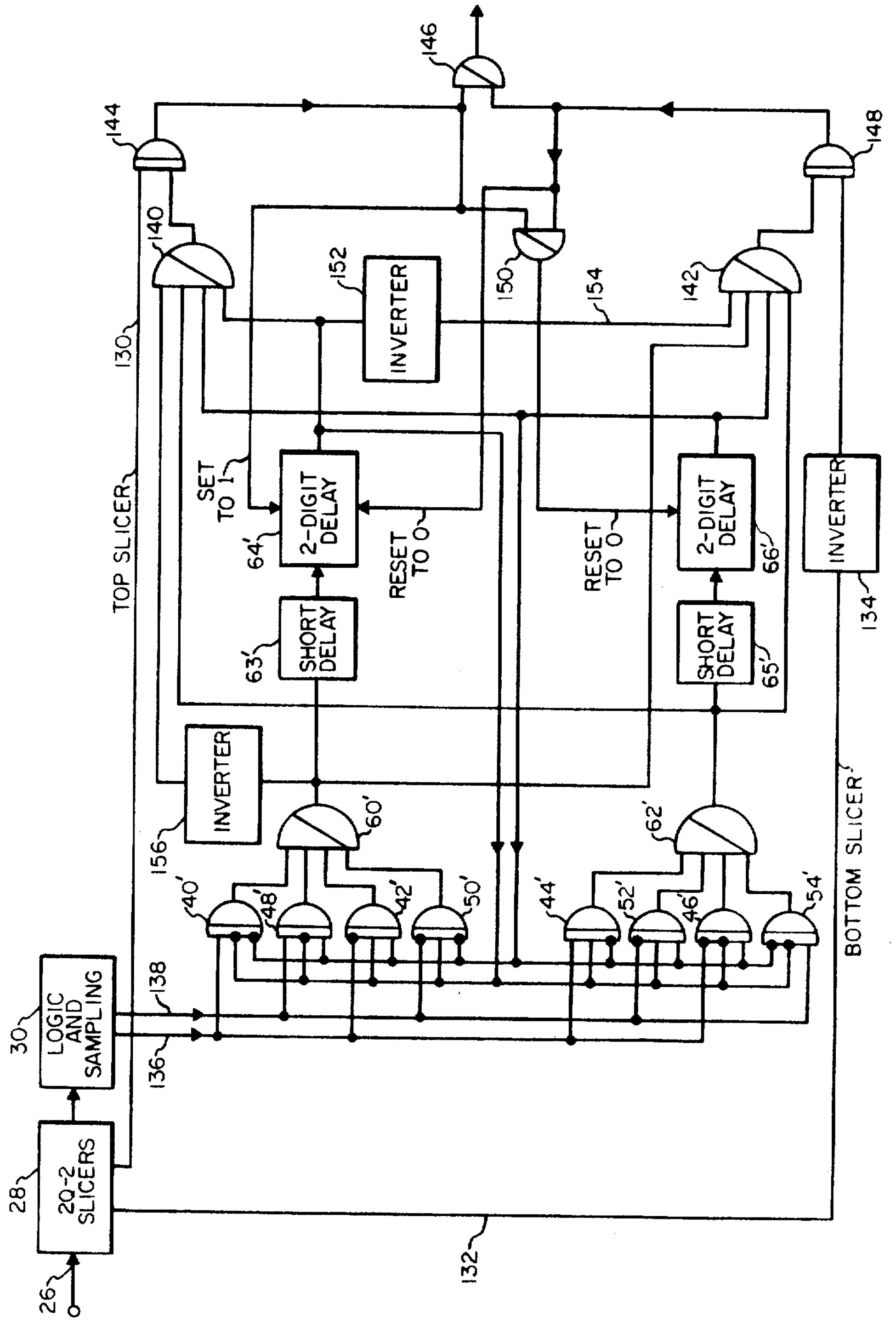
FIG. 7 is a combined block and logic diagram showing the error detection system of FIG. 6 in greater detail.

Because of the direct correspondence between the binary representation and the nonbinary signal level, the parallel binary output from the logic and sampling circuits 30 in FIG. 7 can be readily determined. These binary representations for the transmitted waveform A in FIG. 8 and for received waveform B are tabulated in Tables IV and V, of FIGS. 9 and 10, respectively.

From Table II and the received waveform B, the X' and Y' binary inputs to the error detection coder can be directly written; this has been done in FIG. 10. The coded binary outputs $C'_1$ and $C'_2$, and the delayed coded binary signals $\Delta^2C'_1=Z'$ and $\Delta^2C'_2=W'$, must be derived from the coding process. However, this requires a knowledge of the past history of the waveform, at least for two digits prior to digit position 1. These two digits are merely the arbitrary initial binary states of the two-digit delays 64' and 66' in FIG. 7, which are two-stage shift registers which can have any binary states before the transmission commences. Should these binary states be inconsistent with the coding process at the transmitter, error indication will appear when an extreme level is reached causing the delays 64' and 66' to be set or reset to the correct state. This initial error indication, which is false, is not significant and is usually disregarded when the transmission begins. It is known, however, that waveform A was obtained by subtracting the second digit back from the present digit. In this example, the nonbinary coded signal used in the formation of waveform A has four amplitude levels: namely, 0, 1, 2 and 3. Also, the extreme level, +3 or −3, can be formed in only one way: the +3 level can be obtained only when the present digit is 3 and the second digit back is 0, and −3 can be obtained only when the present digit is 0 and the second digit back is 3.

In the illustrated example of waveforms A and B, the level is −3 for the first two digit positions and, therefore, the current nonbinary digit in each position is zero so that the second digit back must have been +3. From this, the coded parallel binary representation can be derived starting with two digit positions back from the illustrated first digit position, this being shown as $C'_1$ and $C'_2$ in Table V. The delayed binary representations Z' and W' are obtained directly from $C'_1$ and $C'_2$, respectively, by taking the $C'_1$ and $C'_2$ binary representation delayed by two digit positions. As soon as the first error occurs, there is a difference in the coded binary representation, and since a double error occurs at digit position 4, both $C'_1$ and $C'_2$ are changed. The general effect of an error is to maintain a difference which would most likely be present when the top or bottom level occurs in the received waveform, and it is at this point that the error would be detected. In the illustrated example, the first maximum level—in this case the bottom—following the error at digit positions 4 and 5 occurs at digit position 9. As shown in Table V, the regenerated binary representations at digit position 9 are $Z'=0$, $W'=1$, $C'_1=1$, and $C'_2=1$. From delay circuit 64', Z is applied to an inverter 152 which causes a pulse to be applied over lead 154 to one of the inputs of OR-gate 142. Since W', $C'_1$ and $C'_2$ are applied directly to respective ones of the other three inputs of OR-gate 142, all four inputs have an input pulse. Although a pulse on any one of the inputs is sufficient to deliver an output pulse, the presence of a pulse on all of the inputs produces an output pulse which is applied to one input of AND-gate 148. Remembering that a pulse indicative of no output from the bottom slicer is applied to the other input of gate 148, it delivers an output pulse which is applied through OR-gate 146 to an error indicator. As previously noted, the error pulse is also applied to the RESET lead of delay circuit 64' and through OR-gate 150 to the RESET lead of delay circuit 66'. Thus, $C'_1$ and $C'_2$ at digit position 9 are each "RESET" to zero. This is shown under the "Memory RESET" column in the table of FIG. 10.

Operation of the error detector is similar for the second error, namely the one occurring at digit position 5, it being detected at digit position 10, the next following position at which a maximum level occurs.

For the single error occurring at digit position 16, correction is not made until digit position 18 when a maximum upper level occurs. The top level pulse indication from slicer 28 is applied to one input of AND-gate 144. It will be observed from Table V that at pulse position 18 the pulses are $Z'=0$, $W'=1$, $C'_1=0$ and $C'_2=0$. The pulse indication from W' is applied directly to OR-gate 140. The $C'_1$ pulse indication is first applied to an inverter 156 which changes the input pulse $C'_1=0$ to an output pulse indication $C'_1=1$, which is applied to another input of OR-gate 140. Both the W' and $C'_1$ pulse indications are applied via OR-gate 140 to one input of AND-gate 144. Also, both Z' and $C'_2$ are applied directly to OR-gate 140. Since $C'_1$ and $C'_2$ are each 0, their presence has no operative effect on OR-gate 140.

The presence of a pulse indication at each input to AND-gate 144 produces an output indicating that an error has occurred, the resulting error pulse from gate 144 being applied through OR-gate 146 to an error detector. The error pulse is also applied to the SET lead of delay circuit 64' and to the RESET of delay circuit 66' via OR-gate 150. This sets the $C'_1$ input of delay 64' to 1 and the $C'_2$ input of delay circuit 66' to 0 for digit position 18. Reference to Table IV indicates that at digit position 18 $C_1=1$ and $C_2=0$. Thus, the inputs to delay circuits 64' and 66' are corrected so that subsequent formations of the $C'_1$ and $C'_2$ coded binary signals are in agreement with the transmitted wave. This condition of agreement would be maintained until another error occurs.

The foregoing error detection technique takes advantage of the inherent redundancy in the nonbinary analog waveform and does not require redundant digits in the original data signal. In contrast, conventional systems require insertion of redundant digits to detect errors thus reducing the effective transmission rate and introducing complexities.

From the foregoing description it is apparent that applicant has provided a data transmission system employing correlative techniques whereby the transmission rate of binary data over a band limited transmission channel is significantly increased. Moreover, the inherent redundancy in the nonbinary analog waveform is used for error detection without requiring redundant digits in the original data signal which would reduce the transmission rate.

While the principles of the invention have been described for the specific example in which the value of $Q=4$, it is emphasized that Q may be any larger power of 2 without departing from the spirit of or losing the advantages of the invention. Also, although specific circuitry has been illustrated to describe the principles of operation of the invention, modifications thereof or different forms of logic can be applied without departing from the true spirit and scope of the invention.

What is claimed is:

1. In a digital communication system including a transmitter wherein a binary input signal in serial form is converted into a nonbinary correlative signal the amplitude of successive digit intervals of which may be one of an uppermost level, a lowermost level, or one of a plurality of levels intermediate said uppermost and lowermost levels, for transmission to a receiver over a medium in which errors may be introduced in transmission, apparatus at said receiver for detecting said errors, comprising:

means for deriving from the received nonbinary correlative signal a replica of said binary input signal in parallel form except for such errors that may have occurred in transmission;

means operative on said replica of said binary signal for simulating said nonbinary correlative signal except for such errors that may have occurred in transmission;

means for determining during each digit interval of the received signal the presence or absence of said uppermost or lowermost amplitude levels;

means for determining whether said simulated signal has an uppermost or a lowermost amplitude level during digit intervals when said received signal is of uppermost or lowermost amplitude, respectively; and means for producing an error indication in response to a lack of coincidence of uppermost or lowermost levels between said received signal and said simulated signal during corresponding bit intervals.

2. Apparatus in accordance with claim 1, wherein said means for simulating said nonbinary correlative signal includes:

a coder connected to the output of said replica deriving means and operative to introduce memory into said replica and to produce at its output a plurality of separately coded parallel binary output signals; and a digital logic correlator connected to the output of said coder and operative to introduce correlation into said coded binary signals and to produce at its output said simulated nonbinary correlative signal.

3. In a digital communication system having a band-limited transmission channel, apparatus for converting a serial binary data stream into a nonbinary correlative signal at the transmitter and recovering the serial binary data at the receiver, which comprises at the transmitter:

a serial-to-parallel converter operative to convert said serial binary data stream into $\log_2 Q$ parallel data streams where $Q=2^n$ and $n$ is an integer greater than two;

a coder having an input connected to the output of said converter and an output, said coder being operative separately to introduce memory into each of said $\log_2 Q$ parallel binary data streams and to produce at its output a like plurality of coded parallel binary data streams;

means connected to the output of said coder for combining said separately coded parallel binary data streams by modulo Q addition to produce a coded nonbinary data stream having Q amplitude levels;

subtracting means having an input connected to the output of said combining means and an output, said subtracting means being operative to subtract the second digit back from the present digit of said Q-level signal to produce a level coded nonbinary correlative signal having (2Q−1) amplitude levels for transmission to a receiver and which comprises at said receiver;

means for determining which one of said (2Q−1) received levels exists during each successive digit interval of said received nonbinary correlative signal;

(2Q−) AND-gates one for each signal amplitude, namely a first AND-gate operatively connected to receive only the lowermost amplitude level output of said determining means, said first AND-gate having an output only when its input is below a predetermined threshold; a second AND-gate operatively connected to receive only the uppermost amplitude level output of said determining means, said second AND-gate having an output only when its input is below a predetermined threshold; 2Q−3 intermediate two-input AND-gates each having an inhibit input, said intermediate AND-gates, respectively, operatively connected to adjacent outputs of the determining means with said inhibit input being connected to the upper of the adjacent amplitude levels;

a shift register containing $\log_2 Q$ stages with each stage having a set and reset input; and, $2\log_2 Q$ OR-gates connected in pairs one of each pair having an output connected to said set input and the other OR-gate of the pair being connected to the reset input of said shift register, the OR-gate inputs being operatively connected to the AND-gate outputs so that only one OR-gate of each said pair will have an output for each input signal amplitude and thereby converting the nonbinary signal amplitude into a serial binary data stream.

4. Apparatus for generating a correlative nonbinary signal having (2Q−1) signal amplitudes; where Q=4, and the nonbinary signal is generated according to the relation $C=B+\Delta^2 C$ Mod Q, where B is the noncorrelated digital input signal, C is the coded output signal, $\Delta^2$ is a delay of two digit intervals of C, and Q is equal to the number of nonbinary signal levels of B; from a noncorrelated serial binary signal, which comprises:

means for converting the noncorrelated serial binary signal into two parallel binary streams represented by X and Y;

means for coding each of said parallel binary streams according to the relation $$C_1=XZ'W'=YZ'W+X'ZW+Y'ZW'$$

$$C_2=ZXW'+Y'ZW+X'Z'W+YZ'W''$$

where, $C_1$ is the coded output representation of the binary stream $X$, $C_2$ is the coded output representation of the binary stream $Y$, $Z$ is $C_1$ delayed by two digit intervals $\Delta^2 C_1$, $W$ is $C_2$ delayed by two digit intervals $\Delta^2 C_2$ and, the prime denotes negation;

means for combining the two coded binary streams into a nonbinary digital signal having Q levels; and, means for subtracting the second digit back from the present digit of the nonbinary digital signal to introduce correlation and level conversion, thereby to obtain a nonbinary correlative output signal having (2Q−1) amplitude levels.

5. Apparatus according to claim 4 wherein said coding means comprises:

a first set of four three-input AND-gates having X, Y, Z and W inputs to the set;

a first OR-gate having four inputs and an output, one said input being connected to the output of one of the four three-input AND-gates of said first set;

a second set of four three-input AND-gates having X, Y, Z and W inputs to the set;

a second OR-gate having four inputs and an output, one said input being connected to the output of one of the four three-input AND-gates of the second set;

a first delay circuit with a delay of substantially two digit intervals, $\Delta^2$, having an input and a delayed output the input being connected to the output of said first OR-gate, said delayed output being connected both to an input of said first AND-gate set and to an input of said second AND-gate set;

a second delay circuit with a delay of substantially two digit intervals, $\Delta^2$, having an input and a delayed output, the input being connected to the output of said second OR-gate, and said delayed output being connected both to an input of said first AND-gate set and to an input of said second AND-gate set;

said first OR-gate having one output state for any one of the following input conditions to the first AND-gate set:

X Z' W'
X'Z W
X' Z W
Y Z' W
Y' Z W' where the prime indicates negation, and the other state for all other conditions; and said second OR-gate having one output state for any one of the following input conditions to the second AND-gate set:

X Z W'

X Z' W
Y Z W'
Y Z' W and the other state for all other input conditions.

6. Apparatus according to claim 5 wherein said subtracting means further comprises:

a band-pass filter in which the frequency-attenuation characteristic substantially approximates the mathematical expression $$|1-e^{-j2\omega T}|$$

over the interval $f=0$ to $f=1/2$ T Hz., where T is the digit interval of the nonbinary correlative signal, $\omega$ is equal to $2\pi$ times the frequency, $e$ is the Naperian base of the natural logarithm, and $j$ is the standard operator notation for the square root of $-1$.

7. Apparatus according to claim 6 wherein said converting means further comprises a two-stage shift register.

UNITED STATES PATENT OFFICE
CERTIFICATE OF CORRECTION

Patent No. 3,601,702 Dated August 24, 1971

Inventor(s) ADAM LENDER

It is certified that error appears in the above-identified patent and that said Letters Patent are hereby corrected as shown below:

Column 15, line 56, "received" should read -- amplitude --; line 59, "(2Q-)" should read -- (2Q-1) --. Column 16, line 20, "XZ'W' = YZ'W" should read -- XZ'W' + YZ'W --; line 67, delete "X'ZW".

Signed and sealed this 5th day of September 1972.

(SEAL)
Attest:

EDWARD M.FLETCHER,JR.
Attesting Officer

ROBERT GOTTSCHALK
Commissioner of Patents